United States Patent
Konno et al.

(10) Patent No.: US 7,865,628 B2
(45) Date of Patent: Jan. 4, 2011

(54) PCI EXPRESS CARD TYPE PERIPHERAL APPARATUS AND HOST APPARATUS FOR ACCESSING PARTS OF PROTOCOL ID INFORMATION STORED IN STORAGE UNIT ONE PART AFTER ANOTHER

(75) Inventors: Tamaki Konno, Tokyo (JP); Kenichi Satori, Tokyo (JP); Junko Nagata, Tokyo (JP); Noriyuki Hosoe, Kanagawa (JP); Naohiro Adachi, Kanagawa (JP); Kenichi Nakanishi, Tokyo (JP)

(73) Assignee: Sony Corporation (JP)

( * ) Notice: Subject to any disclaimer, the term of this patent is extended or adjusted under 35 U.S.C. 154(b) by 119 days.

(21) Appl. No.: 11/825,120

(22) Filed: Jul. 2, 2007

(65) Prior Publication Data

US 2008/0022018 A1  Jan. 24, 2008

(30) Foreign Application Priority Data

Jul. 3, 2006 (JP) .......................... P2006-183802

(51) Int. Cl.
*G06F 3/00* (2006.01)
(52) U.S. Cl. .................... 710/11; 710/8; 710/9; 710/10; 710/34; 710/104; 710/305; 713/1; 713/2; 713/100; 711/115; 711/170
(58) Field of Classification Search ............... 710/8–10, 710/34, 1, 2, 104; 711/115, 170; 713/1, 713/2, 100
See application file for complete search history.

(56) References Cited

U.S. PATENT DOCUMENTS

| | | | |
|---|---|---|---|
| 6,256,692 B1 * | 7/2001 | Yoda et al. .................. | 710/104 |
| 6,941,405 B2 * | 9/2005 | Morrow ....................... | 710/305 |
| 7,103,743 B2 * | 9/2006 | Goldschmidt ............... | 711/170 |
| 7,577,830 B2 * | 8/2009 | Porterfield .................. | 713/1 |
| 2004/0010678 A1 * | 1/2004 | Whitt ........................... | 713/1 |
| 2005/0138288 A1 * | 6/2005 | Chou et al. .................. | 711/115 |
| 2006/0117123 A1 | 6/2006 | Izumida | |

FOREIGN PATENT DOCUMENTS

JP  2002033786 A  1/2002

(Continued)

OTHER PUBLICATIONS

PCI-SIG;"PCI Express TM Base Specification"; PCI-SIG; Revision 1.0a; Apr. 15, 2003; see—"http://www.pcisig.com/specifications".*

(Continued)

*Primary Examiner*—Tammara Peyton
(74) *Attorney, Agent, or Firm*—Lerner, David, Littenberg, Krumholz & Mentlik, LLP (57) ABSTRACT

A card type peripheral apparatus connected to a host apparatus for communication therewith according to a specific protocol. The card type peripheral apparatus includes a plurality of configuration registers configured to be accessible by the host apparatus and to be set with diverse set information. At least one of the plurality of configuration registers is a special register configured to be set with data arbitrarily selected and fixedly established by a vendor that either fabricates or markets the card type peripheral apparatus. The special register is set with protocol identification information for discriminating the specific protocol.

12 Claims, 10 Drawing Sheets

FOREIGN PATENT DOCUMENTS

| | | | |
|---|---|---|---|
| JP | 2004229038 | A | 8/2004 |
| JP | 2005-275909 | A | 10/2005 |
| JP | 2006-155183 | A | 6/2006 |

OTHER PUBLICATIONS

PCI-SIG;"PCI Express TM Base Specification"; PCI-SIG; Revision 1.0a; Apr. 15, 2003; see—http://www.pcisig.com/specifications, pp. 94-96 attached.*

Office Action from Japanese Application No. 2006-183802 dated Mar. 23, 2010.

TECH I Revised new edition, Through study of PCI & PCI—X bus, vol. 21, Japan, CQ publication Co., Ltd. Hisayoshi Masuda, Jul. 1, 2004, vol. 21, p. 111, p. 123 (Commentary book of the PCI).

Ravi Buduruk, Don Anderson, Tom Shanley, PCI Express System Architecture, U.S.A., MindShare, Inc., Jun. 30, 2003, p. 770-772, p. 848-849 (Commentary book of PCI-Express).

* cited by examiner

| | 0 | 8 | 16 | 24 | 31 |
|---|---|---|---|---|---|
| | VENDOR ID | | DEVICE ID | | |
| | COMMAND | | STATUS | | |
| | REVISION ID | CLASS CODE | | | |
| | CACHE LINE SIZE | LATENCY TIMER | HEADER TYPE | BIST | |
| | BASE ADDRESS REGISTER 0 | | | | |
| | BASE ADDRESS REGISTER 1 | | | | |
| | BASE ADDRESS REGISTER 2 | | | | |
| | BASE ADDRESS REGISTER 3 | | | | |
| | BASE ADDRESS REGISTER 4 | | | | |
| | BASE ADDRESS REGISTER 5 | | | | |
| | CARDBUS CIS POINTER | | | | |
| | SUBSYSTEM VENDOR ID | | SUBSYSTEM ID | | |
| | EXPANSION ROM BASE ADDRESS | | | | |
| | CAP.LIST PTR | RESERVED | | | |
| | RESERVED | | | | |
| | INTERRUPT LINE | INTERRUPT PIN | Min_Gnt | Max_Lat | |

```
ADDR (d)  DATA (h)
   0    41001d82          41 00 1d 82        A
   4    45444342          45 44 43 42        E D C B
   8    49484746          49 48 47 46        I H G F
  12    4d4c4b4a          4d 4c 4b 4a ⎫      M L K J ⎫
  16    51504f4e          51 50 4f 4e ⎬─PRO  Q P O N ⎬─PRO
  20    55545352          55 54 53 52 ⎪      U T S R ⎪
  24    59585756          59 58 57 56 ⎭      Y X W V ⎭
  28    3231305a          32 31 30 5a        2 1 0 Z
  32    52001c90          52 00 1c 90        R
  36    00CS1956          00 CS 19 56           CS
  40    00000000          00 00 00 00
  44    00000000          00 00 00 00
  48    00000000          00 00 00 00
  52    00000000          00 00 00 00
  56    00000000          00 00 00 00
  60    78000000          78 00 00 00        V
```

FIG.8

*Large Resource Type ID String Tag (02h)*
*001d (h) = 29 (d) byte*
*"ABCDEFGHIJKLMNOPQRSTUVWXYX012"*
⎫
⎬ ID STRING AREA
⎭

*Large Resource Type VPD-R Tag (10h)*
*001c (h) = 28 (d) byte*
*"RV"*
*19 (h) = 25 (d) byte*
*Checksum : CS*
*Reserved : 00*

*Small Resource Type End Tag (0Fh)* ⎬ END

FIG. 9A

| | VENDOR DATA 0 | VENDOR DATA 1 | LENGTH | | |
|---|---|---|---|---|---|
| 31 | | | 16 | 8 | 0 |
| | 41h | 20h | Next Pointer | | ID=09h |
| | 45h | 44h | 43h | | 42h |
| | 49h | 48h | 47h | | 46h |
| | 4dh | 4ch | 4bh | | 4ah |
| | 51h | 50h | 4fh | | 4eh |
| | 55h | 54h | 53h | | 52h |
| | 59h | 58h | 57h | | 56h |
| | 32h | 31h | 30h | | 5ah |

VENDOR DATA 7 ↙ R2

FIG. 9B

```
A B C D E
F G H I
J K L M    ← PRO
N O P Q
R S T U
V W X Y
Z 0 1 2
```

PCI EXPRESS CARD TYPE PERIPHERAL APPARATUS AND HOST APPARATUS FOR ACCESSING PARTS OF PROTOCOL ID INFORMATION STORED IN STORAGE UNIT ONE PART AFTER ANOTHER

CROSS-REFERENCE TO RELATED APPLICATIONS

This application claims priority from Japanese Patent Application No. JP 2006-183802 filed with the Japanese Patent Office on Jul. 3, 2006, the entire content of which is incorporated herein by reference.

BACKGROUND OF THE INVENTION

1. Field of the Invention

The present invention relates to a card type peripheral apparatus and a host apparatus.

2. Description of the Related Art

There exist PC cards serving as various card type peripheral apparatuses which, when put to use, are attached to a host apparatus such as a personal computer. Known PC cards include the PCI Card that communicates via a PCI bus and the PCI ExpressCard that communicates over a PCI Express bus permitting higher data transfer rates than the PCI bus (see Japanese Patent Laid-open Nos. 2005-275909 and 2006-155183).

Illustratively, the PCI ExpressCard is standardized physically, electrically and logically. While complying with this standard, the PCI ExpressCard is subject to diverse device-specific control protocols that vary from one manufacturer to another.

The ExpressCard standard stipulates not only the shape and dimensions of the card but also the specifications of the slot and connectors of the host apparatus. For that reason, any ExpressCard complying with the ExpressCard standard can be physically connected to the host apparatus. The PCI Express interface subsumed under the ExpressCard standard is also standardized electrically and logically. Thus any ExpressCard complying with the PCI Express standard can also be connected to the host apparatus electrically and logically.

On the other hand, the control protocols by which the host apparatus communicates with the cards have yet to be standardized. The control protocol specifications vary from one manufacturer to another and even from one device to another.

In the past, the host apparatus typically used a given combination of a vendor ID, a device ID, a revision ID, a subsystem ID, a subsystem vendor ID, and a class code as discriminating factors by which to identify only those cards that comply with a particular control protocol among diverse control protocols. Where different manufacturers using different devices fabricated cards subject to the same control protocol, connectivity (i.e., normal communication) between these cards on the one hand and the host apparatus on the other hand was guaranteed by having the host apparatus additionally furnished with information about the new card manufacturers and their devices being used.

The connectivity above has generally been ensured in the above-outlined manner by personal computer (PC) systems. Typically, a device driver corresponding to any newly introduced card is added to or updated in the host apparatus (i.e. PC system) over a network or using a suitable storage medium. The added or updated device driver supplies information about the new card manufacturer and their device to the host apparatus as additional discriminating factors.

SUMMARY OF THE INVENTION

There exist host apparatuses (electronic apparatuses) such as card-attachable cameras so designed as to be incapable of receiving, over a network or using a storage medium, device drivers corresponding to any newly introduced cards. This type of host apparatus may identify given cards in the same manner as PC systems. In that case, the host apparatus may identify and communicate with a first card subject to a given control protocol but may not communicate with a second card fabricated by a different manufacturer using a different device despite the fact that the second card complies with the same control protocol and is connectable physically, electrically and logically to the host apparatus.

The problem above is encountered by the host apparatus being incapable of discriminating the second card as one that can be controlled under the control protocol specific to the host apparatus in question. Since it is impossible to add or update device drivers in the host apparatus over a network or using a storage medium in order to reflect the information about the new card manufacturer and the new device, the host apparatus may have to be brought to its manufacturer or a service center for device driver update. This can be a serious problem contingent on the urgency of the user's need to use the electronic apparatus.

The present invention has been made in view of the above circumstances and provides a card type peripheral apparatus and a host apparatus such that the host apparatus can easily discriminate the protocol of the card type peripheral apparatus without recourse to a network or a storage medium.

In carrying out the present invention and according to one embodiment thereof, there is provided a card type peripheral apparatus connected to a host apparatus for communication therewith according to a specific protocol, the card type peripheral apparatus including a plurality of configuration registers configured to be accessible by the host apparatus and be set with diverse set information; wherein at least one of the plurality of configuration registers is a special register configured to be set with data arbitrarily selected and fixedly established by a vendor that either fabricates or markets the card type peripheral apparatus; and wherein the special register is set with protocol identification information for discriminating the specific protocol.

According to another embodiment of the present invention, there is provided a host apparatus for communicating with a card type peripheral apparatus having a plurality of configuration registers according to a specific protocol, at least one of the plurality of configuration registers being a special register configured to be set with data arbitrarily selected and fixedly established by a vendor that either fabricates or markets the card type peripheral apparatus, the host apparatus including: a reading unit configured to access the plurality of configuration registers so as to read protocol identification information for discriminating the specific protocol from the special register; and a communication control unit configured to communicate with the card type peripheral apparatus under the protocol found applicable to the card type peripheral apparatus based on the protocol identification information read by the reading unit.

According to the present invention, as outlined above, the protocol identification information for discriminating a specific protocol is set in a special register which is one of a plurality of configuration registers furnished in the card type peripheral apparatus. The special register is set with the identification information arbitrarily selected and fixedly established by the vendor that fabricates or markets the card type peripheral apparatus. These arrangements allow the host apparatus easily to discriminate or select the card type peripheral apparatus without using a network or a storage medium. Compared with traditional structures involving the use of the network or storage medium, the inventive arrangements significantly reduce the costs of developing, designing, and fabricating the host apparatus and card type peripheral.

DETAILED DESCRIPTION

Figure 1:
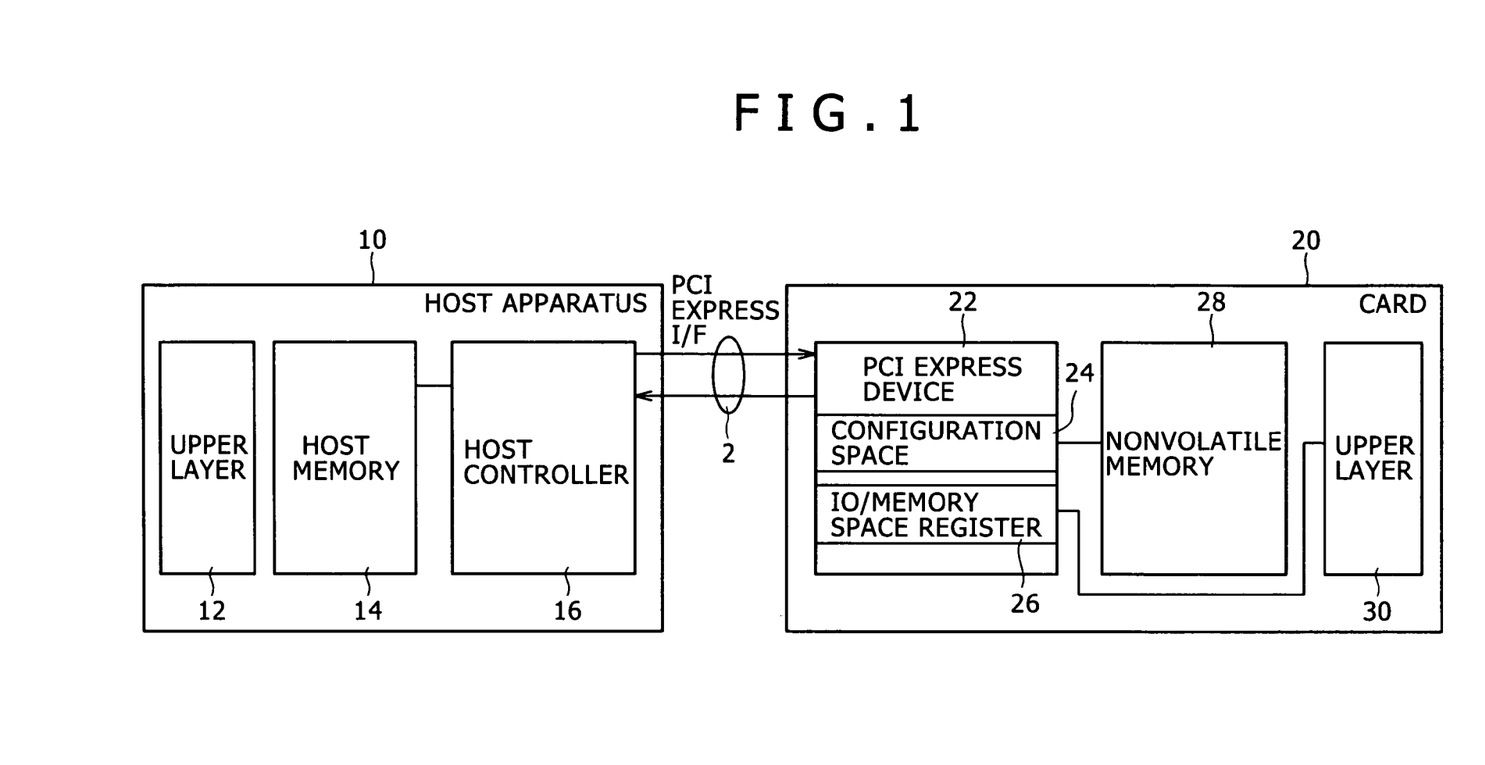
FIG. 1 is a functional block diagram of a host apparatus and a card type peripheral apparatus.

Some preferred embodiments of the present invention will now be described with reference to the accompanying drawings. FIG. 1 is a functional block diagram of a host apparatus 10 and a card type peripheral apparatus 20 embodying the invention. Illustratively, the host apparatus 10 is a camera that creates image data by taking pictures of objects, and the card 20 (card type peripheral apparatus) is a memory card connected to the host apparatus 10 to record the image data picked up by the camera.

In functional terms, the host apparatus 10 is structured to include an upper layer 12, a host memory 14, and a host controller 16.

The upper layer 12 is made up of hardware for creating image data and of software (applications) for controlling the hardware.

The host memory 14 accommodates diverse data and includes a memory that stores the above-mentioned software, a working memory, and a memory that retains actual data. The host controller 16 is constituted by hardware such as a CPU, a DMA and a communication interface and by software to be executed by the CPU. The host controller 16 has a card slot (not shown) which complies with the PCI ExpressCard standard and which permits communication with the attached card 20 via a communication channel 2 constituting a PCI Express bus.

The card 20 is structured to include a PCI Express device 22, a configuration space 24, an IO/memory space register 26, a nonvolatile memory 28, and an upper layer 30.

The PCI Express device 22 has a card connector (not shown) which complies with the PCI ExpressCard standard and which establishes communication with the host apparatus 10 via the communication channel 2 when attached to the card slot of the host apparatus 10. The PCI Express device 22 is formed by a CPU, a communication interface, and software to be executed by the CPU.

The configuration space 24 constitutes an address space which accommodates a plurality of configuration registers and which is part of the address space provided by the PCI Express bus for use by the host apparatus 10 in accessing the card 20.

The configuration registers are set with diverse set information defined by the PCI Express standard. The configuration space 24 and the configuration registers will be discussed later in more detail.

In this embodiment as the memory card, the upper layer 30 serves as a memory area that retains data in rewritable fashion. The IO/memory space register 26 is part of the address space used by the host apparatus 10 in accessing the card 20, the register 26 offering an address space for gaining access to the upper layer 30.

The nonvolatile memory 28 constitutes the storage unit of the present invention. As such, the nonvolatile memory 28 holds protocol identification information for discriminating and determining a specific protocol by which the host apparatus 10 communicates with the card 20. This memory is accessed (i.e., read) by the host apparatus 10 by way of registers accommodated in the configuration space 24. With this embodiment, the memory area making up the upper layer 30 and the nonvolatile memory 28 are formed by the same memory in hardware terms.

Figure 2:
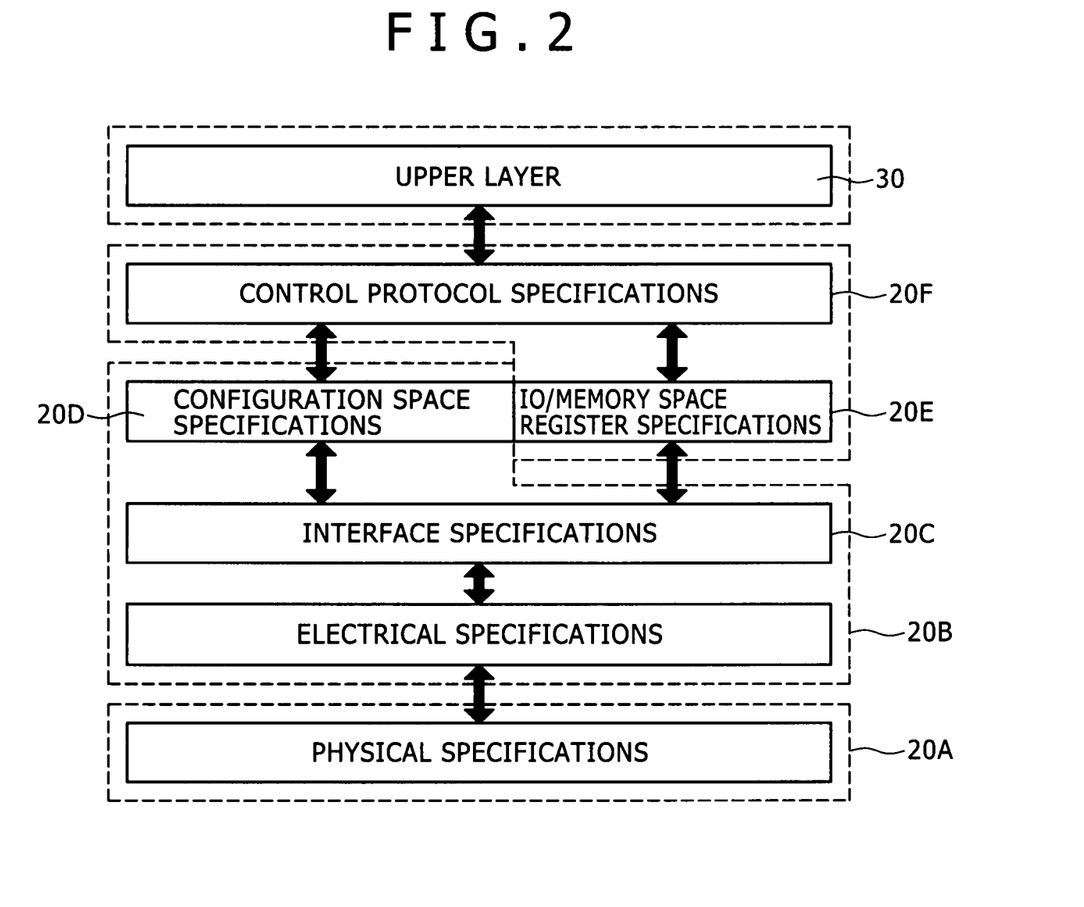
FIG. 2 is a schematic view explanatory of typical specifications of a card.

FIG. 2 is a schematic view explanatory of typical specifications of the card 20. As shown in FIG. 2, the specifications of the card 20 are constituted by physical specifications 20A, electrical specifications 20B, interface specifications 20C, configuration space specifications 20D, IO/memory space register specifications 20E, and control protocol specifications 20F.

The physical specifications 20A comply with the PCI ExpressCard standard and define such physical parameters as the shape and dimensions of the card connector.

The electrical specifications 20B define such requirements as signal voltages and currents; the interface specifications 20C determine communication-related requirements on the physical level; and the configuration space specifications 20D stipulate the parameters regarding the areas established in the configuration space as will be discussed later. The electrical specifications 20B, interface specifications 20C, and configuration space specifications 20D all comply with the PCI Express standard.

The IO/memory space register specifications 20E define the requirements of the IO/memory space register 26. The control protocol specifications 20F principally determine the procedures for communication between the host apparatus 10 and the card 20 (upper layer 30) via the communication channel 2. As such, the control protocol specifications 20F may be established selectively by the manufacturers of the card 20 and may vary depending on the functionality of the card 20.

What follows is an explanation of the configurations space 24. A plurality of data areas are allocated in the configuration space 24. These data areas include a configuration space header (called CSH hereunder) shown in FIG. 3, a vital product capability structure (called VPD Cap) shown in FIG. 4, and a vendor specific capability structure (called VS Cap) shown in FIG. 5. The areas other than these three in the configuration space 24 are irrelevant to the present invention and will not be discussed here. According to the PCI Express standard (PCI standard), allocation of the CSH area is mandatory while the area of VPS Cap and that of VS Cap are left to the vendors' discretion.

Figure 3:
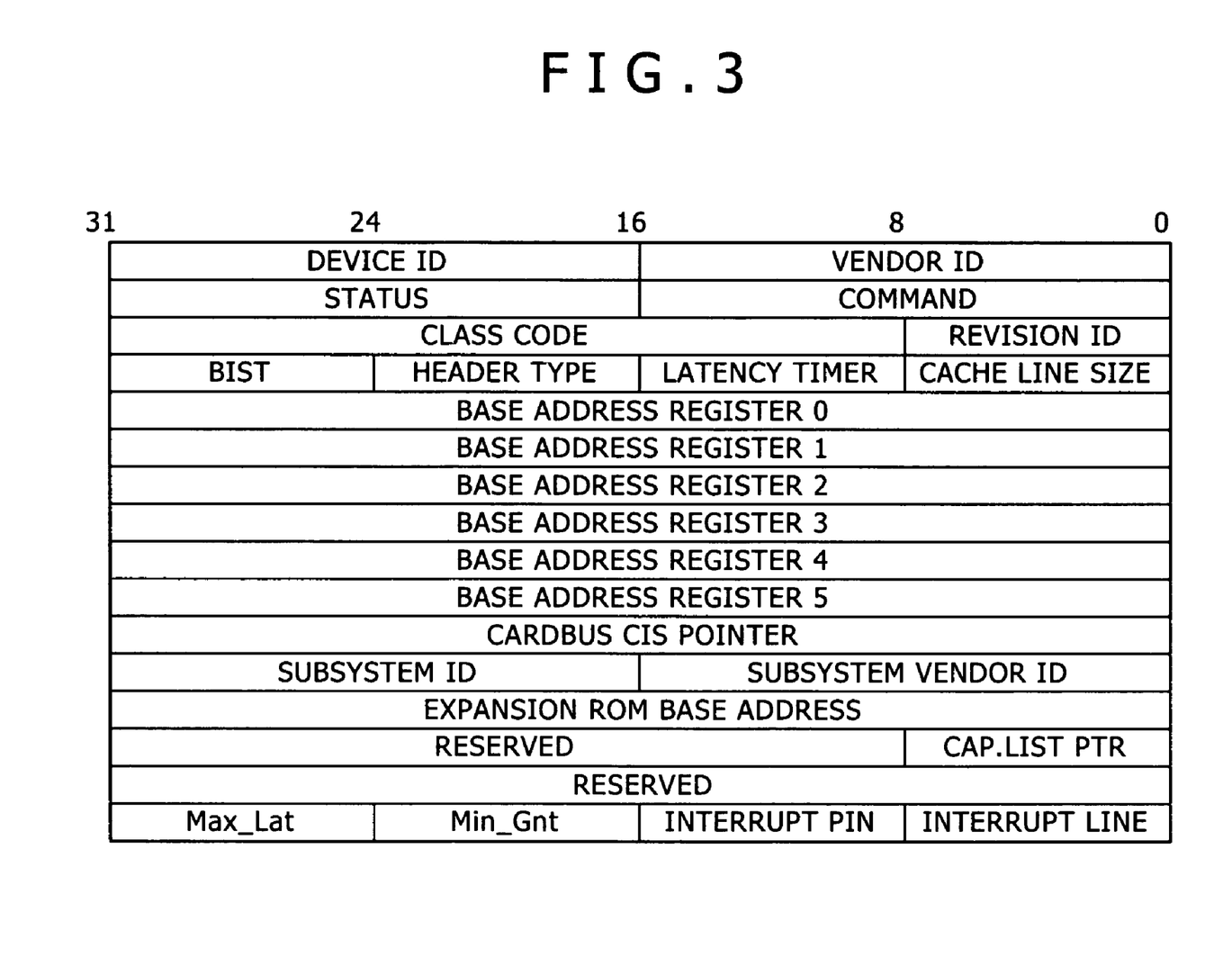
FIG. 3 is a schematic view explanatory of a typical format of a configuration space header.

The CSH area is described below by referring to FIG. 3. CSH has fixed addresses ranging from 00h to 3Fh and is 64 bytes long.

Basically, CSH is an area possessed by all PCI devices and PCI Express devices. CSH has a plurality of IDs (identifiers) set therein for identifying the card 20.

The IDs include a vendor ID uniquely assigned to each device vendor (device manufacturer), a device ID defined arbitrarily by each device vendor for in-house identification purposes, a revision ID indicating the device version and a history of device modifications, a class code assigned to identify the functionality of each device, a subsystem vendor ID uniquely assigned to each card vendor (card manufacturer), and a subsystem ID defined arbitrarily by each card vendor for in-house identification. These IDs are set in corresponding configuration registers such as a vendor ID register, a device ID register, a revision ID register, a class code register, a subsystem vendor ID register, and a subsystem ID register.

If the host apparatus were a personal computer or like equipment capable of acquiring additional device drivers using a network or a storage medium so as to reflect information about new card manufactures and their devices, then the host apparatus would work as follows: the host apparatus would first read the vendor ID, device ID, revision ID, class code, subsystem ID, and subsystem vendor ID from their corresponding configuration registers. Based on the retrieved ID data, the host apparatus would check to determine whether the card 20 in question (device) can be recognized as communicable under the protocol specific to the host apparatus or cannot be recognized and needs to have a corresponding device driver added anew. The host apparatus would take action based on the result of the check.

The host apparatus 10 of this embodiment does not have the capability above and thus proceeds to identify the device (card 20) by the procedures to be discussed later.

The VPD Cap area is described below by referring to FIG. 4. VPD Cap accommodates a first special register R1. In the configuration space, the addresses making up the VPD Cap area may be determined arbitrarily by the vendor. The offset addresses for VPD Cap range from 40h to FFh. The VPD Cap area is a fixed area of eight bytes. VPD data may be placed into four bytes out of the eight in VPD Cap. A field named "F" in VPD Cap denotes a flag that is set to "0" by the host apparatus 10 when it reads the VPD data. When the VPD data is placed in the first special register, the flag F is set to "1" by the card 20 (i.e., PCI Express device 22).

A field named "VPD Address" in VPD Cap contains the address to be read by the host apparatus 100 upon retrieval of the VPD data.

A field named "Next Pointer" will be discussed later.

A field named "ID" in VPD Cap contains the identifier for discriminating the VPD Cap area. In FIG. 4, the ID is shown set to 03h.

A field named "VPD Data" contains data retrieved from the nonvolatile memory 28 and set to the first special register R1. The VPD data is data that may be arbitrarily selected and fixedly established by each vendor that fabricates or markets the card 20. As such, the VPD data includes protocol identification information.

Figure 5:
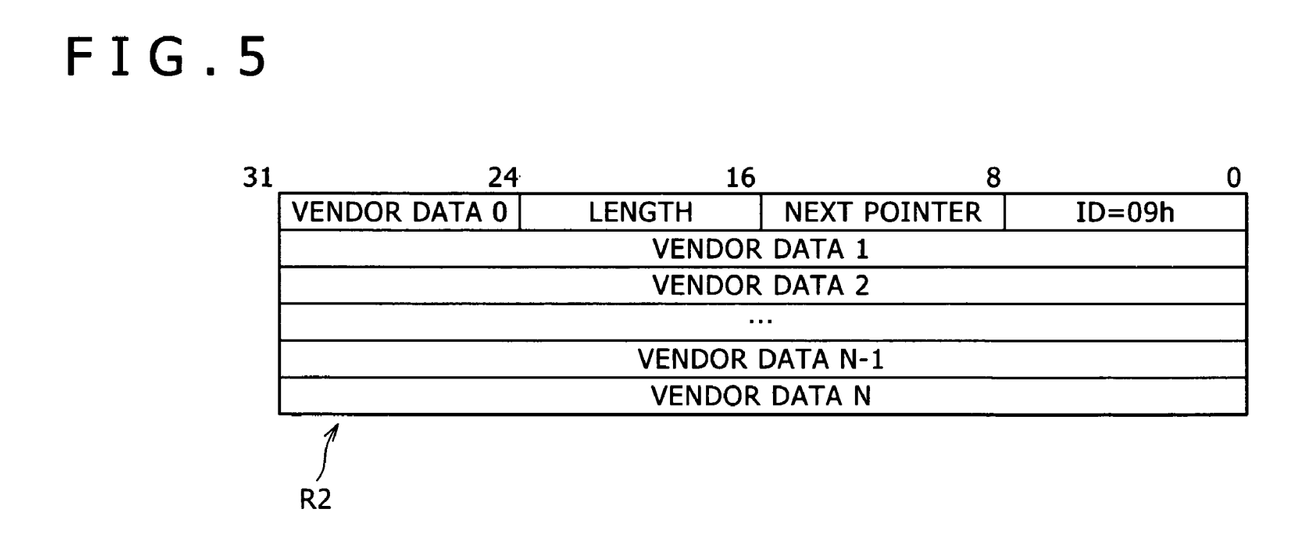
FIG. 5 is a schematic view explanatory of a typical format of a vendor specific capability structure.

The VS Cap area is described by referring to FIG. 5.

VS Cap accommodates a second special register R2. In the configuration space, the addresses making up the VS Cap area may be determined arbitrarily by the vendor. The offset addresses for VS Cap range from 40h to FFh. A field named "Length" is set with data indicating the number of bytes making up the VS Cap area as a whole.

A field named "ID" in VS Cap contains the identifier for discriminating the VS Cap area. In FIG. 5, the ID is shown set to 09h. A field named "Vendor Data" contains data retrieved from the nonvolatile memory 28 and set to the second special register R2. The vendor data is also data that may be arbitrarily selected and fixedly established by each vendor that fabricates or markets the card 20. As such, the vendor data includes protocol identification information.

Because the VPD Cap area and the VS Cap area are not fixed-address areas, they are accessed using the following procedure: CSH has a list pointer (Cap. List. Ptr) pointing to the next address to be accessed in the configuration space as shown in FIG. 3. The host apparatus 10 of this embodiment is arranged to access the VPD Cap area by referencing the value of this list pointer (address data).

Figure 4:
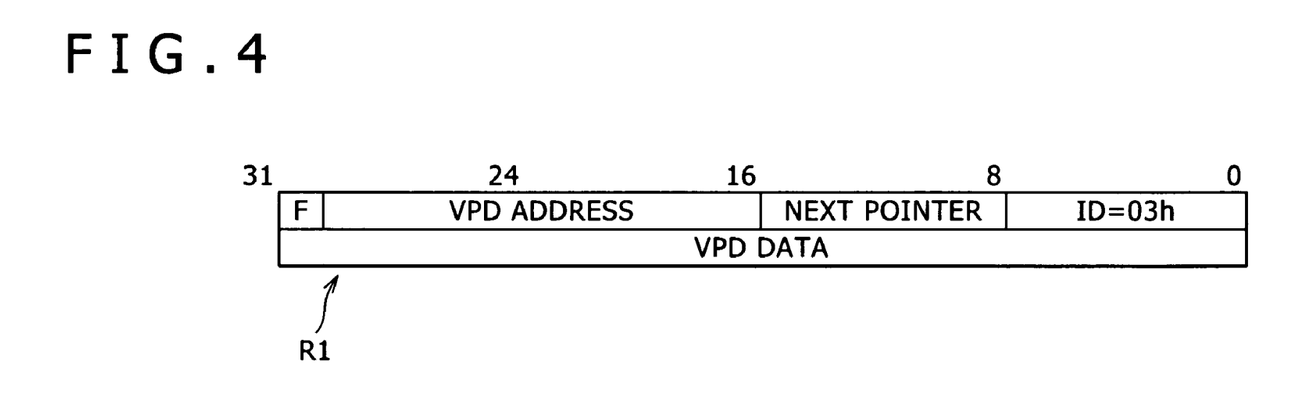
FIG. 4 is a schematic view explanatory of a typical format of a vital product capability structure.

VPD Cap also has a list pointer (Next Pointer) pointing to the next address to be accessed in the configuration space as shown in FIG. 4. The host apparatus 10 of this embodiment is arranged to access the VS Cap area by referencing the value of this list pointer.

VS Cap also has a list pointer (Next Pointer) pointing to the next address to be accessed in the configuration space as shown in FIG. 5. The host apparatus 10 of this embodiment is arranged to access another area by referencing the value of this list pointer.

Figure 6:
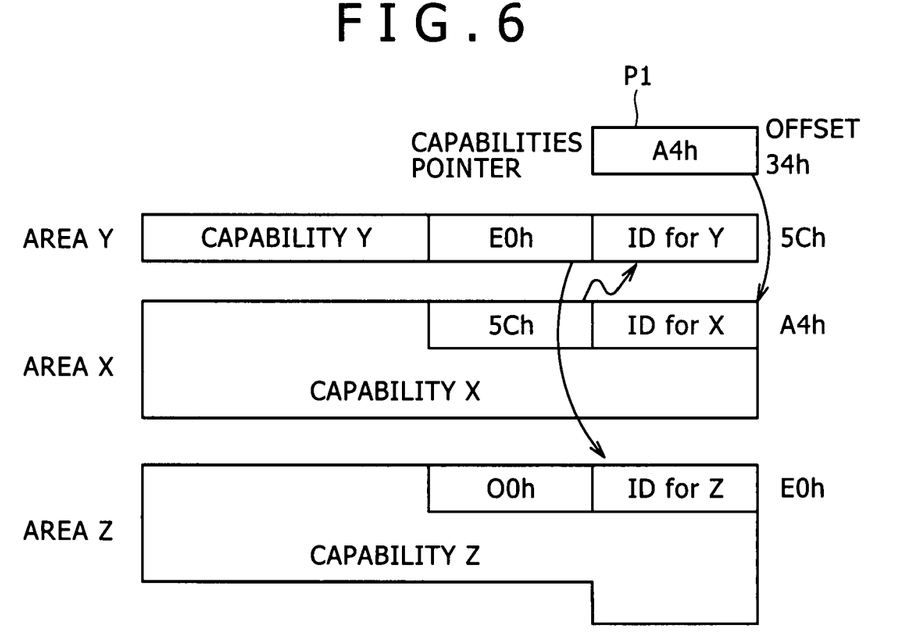
FIG. 6 is a schematic view explanatory of how a plurality of areas (capability structures) in a configuration space are accessed.

Described below in reference to FIG. 6 are the above-outlined operations as they are illustratively carried out in order to access a plurality of areas (capability structures) in the configuration space. If a pointer P1 referenced by the host apparatus 10 points to "A4h," then the host apparatus 10 accesses an area X at address A4h.

The list pointer of the area X points to "5Ch," so that the host apparatus 10 accesses an area Y at address 5Ch.

With the list pointer of the area Y pointing to "E0h," the host apparatus 10 accesses an area Z at address E0h.

The list pointer of the area Z points to "00h," so that the host apparatus 10 determines that there is no more area to be accessed and terminates its accessing process.

That is, the host apparatus 10 gains access to one area after another according to the values of the list pointers of the accessed areas, until the list pointer pointing to "00h" is reached.

This procedure for accessing a plurality of areas (registers) allocated in the configuration space is defined by the PCI Express standard (PCI standard).

What follows is a detailed description of how VPD data is read by use of the first special register R1 in VPD Cap.

Figure 7A:
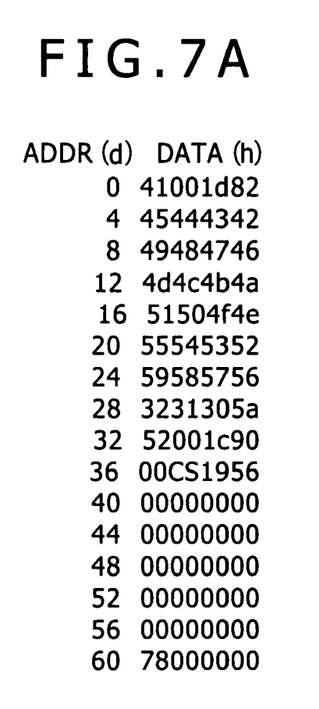
FIGS. 7A, 7B and 7C are schematic views explanatory of a VPD area in a nonvolatile memory.
Figure 7B:
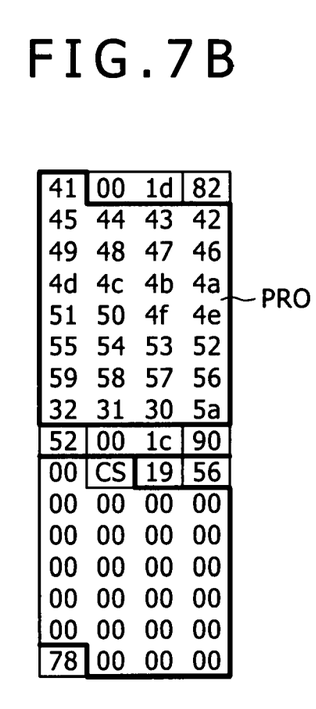
Figure 7C:
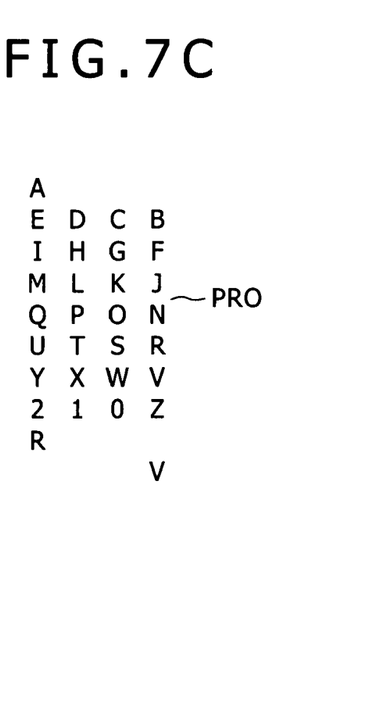
Figure 8:
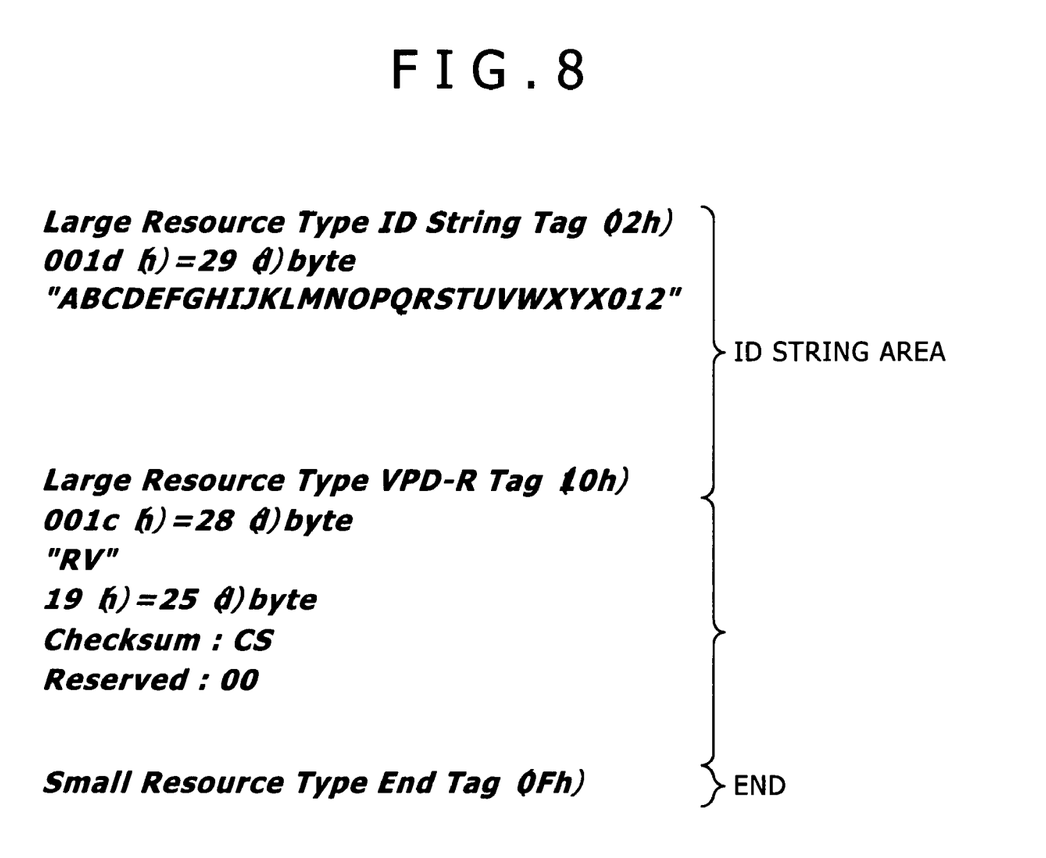
FIG. 8 is a schematic view explanatory of particular significance of VPD data.

FIGS. 7A, 7B and 7C are schematic views explanatory of the VPD area in the nonvolatile memory 28. FIG. 8 is a schematic view explanatory of particular significance of VPD data which includes protocol identification information.

For this embodiment, it is assumed that the protocol identification information is constituted by character string data composed of 29 characters in 29 bytes, "ABCDEFGHIJKLMNOPQRSTUVWXYZ012." As shown in FIG. 7B, the 29-byte data is placed in predetermined portions of the VPD area which are shown enclosed by thick solid lines in the nonvolatile memory 28. The 29-character string ranging from "A" to "2" is allocated as illustrated in FIG. 7C. In FIG. 7C, reference characters R and V indicate data other than the protocol identification information.

As shown in FIGS. 7A and 7B, a 64-byte VPD area is allocated in the nonvolatile memory 28 of this embodiment. This VPD area accommodates protocol identification information PRO composed of 29-byte data, as well as data for use in reading the protocol identification information PRO from the first special register R1.

Of the data at address 00h, "82h" indicates the beginning of VPD data and "001dh" denotes the presence of an ensuing 29-byte character string, as shown in FIG. 7B and FIG. 8. The 29-byte character string is stored from address 41h on. Address 90h in the 30th byte indicates the beginning of a VPD-R area. From address 90h onward, there exist data items which are not used by the present invention but which are needed according to the standard.

What is contained in the first special register R1 is read by the host apparatus 10 in the manner described below.

Initially, the flag F is set to "1."

The host apparatus 10 accesses VPD Cap according to the address held by the list pointer (Cap. List. Ptr) of CSH shown in FIG. 3. The host apparatus 10 thus sets the "VPD Address" field while setting "0" to the flag F at the same time.

When VPD data is set to the first special register R1, the flag F is set to "1."

Upon detecting that the flag F is set to "1," the host apparatus 10 reads four bytes of the VPD address.

The above operations are repeated by incrementing the address set in the "VPD Address" field, until the 29-byte protocol identification information PRO has been read.

Whereas the VPD data is read out using the first special register R1 in units of four bytes that fit the four-byte "VPD Data" field in the register R1, the size of the VPD area (i.e., data size) is not limited to 64 bytes. The VPD data size, along with the data size of the protocol identification information PRO, may be varied as desired.

What follows is a detailed description of how VS data is read out using the second special register R2 in the VS Cap area.

Figure 9A:
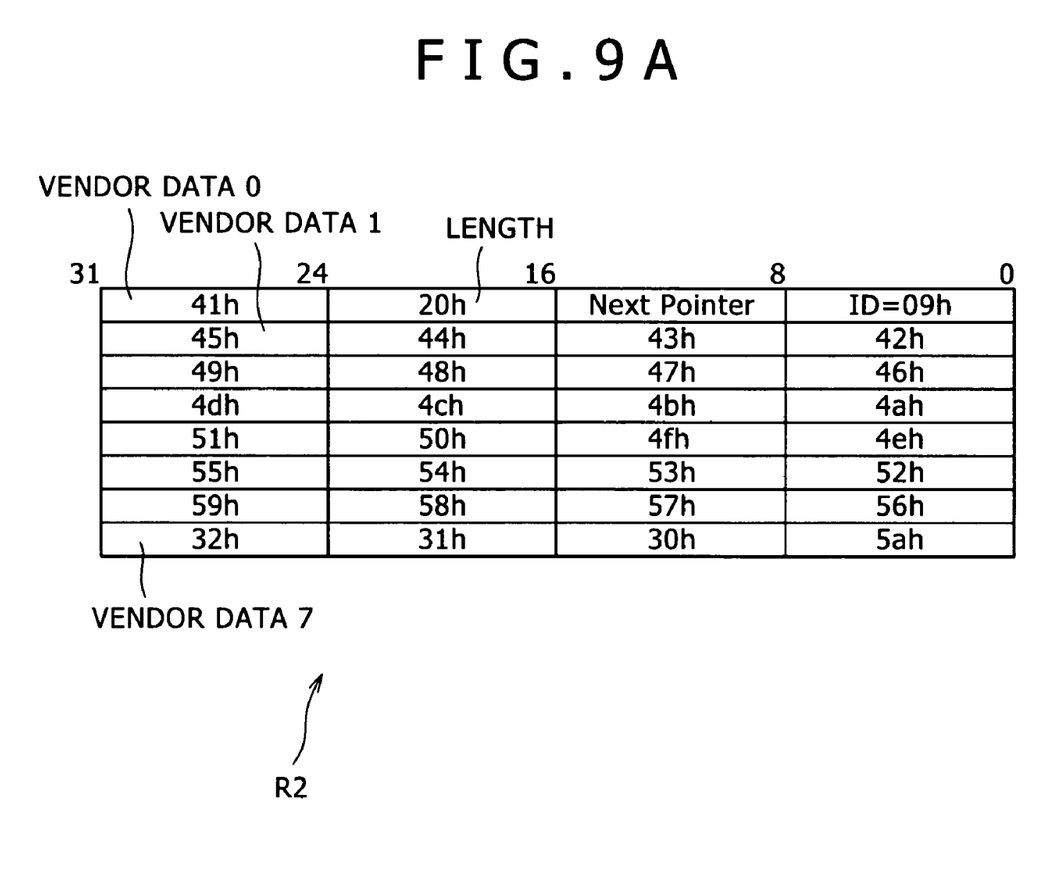
FIGS. 9A and 9B are schematic views explanatory of a second special register R2 in a VS Cap (vendor specific capability structure) area.
Figure 9B:
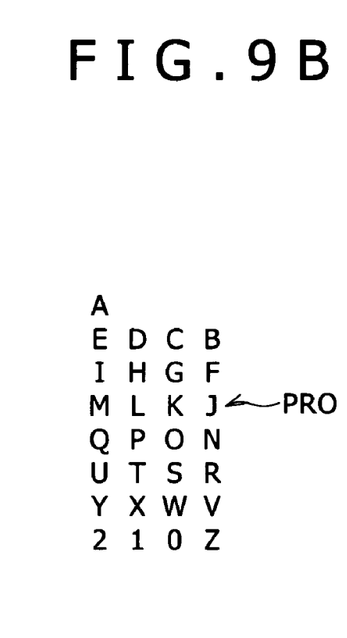

FIGS. 9A and 9B are schematic views explanatory of the second special register R2.

The vendor data set in the second special register R2 includes protocol identification information.

For this embodiment, as mentioned above, the protocol identification information is assumed to be constituted by character string data composed of 29 characters in 29 bytes, "ABCDEFGHIJKLMNOPQRSTUVWXYZ012." For purpose of simplification and illustration, the first and the second special registers R1 and R2 of this embodiment are assumed to contain the same protocol identification information. The first and the second special registers R1 and R2 may each contain the same protocol information, or may retain a first and a second half of a single train of protocol information.

A VS area (not shown) established in advance in the nonvolatile memory 28 is assigned 32 bytes in the case of this embodiment. The VS area accommodates the protocol identification information PRO composed of 29-byte data, as well as data necessary for reading the protocol identification information PRO from the second special register R2.

As shown in FIG. 9A, the second special register R2 in the VS Cap area is assigned 32 bytes in the case of this embodiment. The second special register R2 is set with the 29-byte protocol identification information placed in the VS area, as well as data necessary for reading the protocol identification information PRO.

As shown in FIG. 9A, the "Length" field is set with "20h" indicative of 32 bytes as the entire VS Cap size. Fields named "Vendor Data 0" through "Vendor Data 7" are set with 29-byte protocol identification information PRO of "41h" through "32h" (characters A through 2) respectively.

Unlike the case of the first special register R1, the data in the second special register R2 need not be read out in units of four bytes by designating one address after another; the 32-byte data can be read out all at once.

The host apparatus 10 thus reads data from the second special register R2 as follows: according to the address held by the list pointer ("Next Pointer" field) in VPD Cap shown in FIG. 4, the host apparatus 10 accesses VS Cap. In keeping with the 29-byte data set in the "Length" field, the host apparatus 10 reads the 29-byte protocol identification information PRO making up the data in the "Vendor Data 0" through "Vendor Data 7" fields. The number of "Vendor Data" fields in the second special register R2 in VS Cap may be determined as desired illustratively in units of bytes using the setting of the "Length" field as mentioned above.

The host apparatus 10 performs its identifying operation illustratively as described below.

Figure 10:
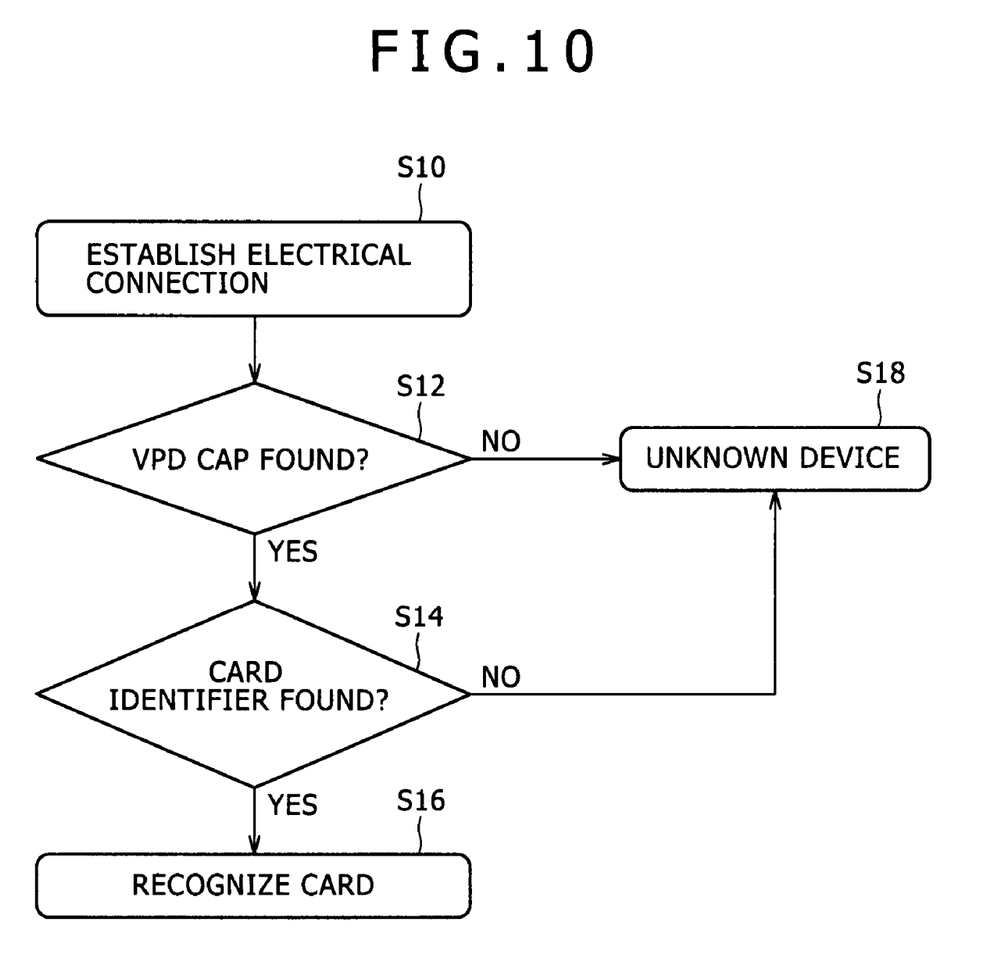
FIG. 10 is a flowchart of steps constituting a first example of the identifying operation performed by the host apparatus.

FIG. 10 is a flowchart of steps constituting the first example of the identifying operation performed by the host apparatus 10. In the first example, only the VPD Cap area is used. In step S10, the card 20 is attached to the card slot of the host apparatus 10 so that an electrical connection is established between the card 20 and the host apparatus 10.

The host apparatus 10 then attempts access to the CSH area. In step S12, the host apparatus 10 checks to determine whether the VPD Cap area can be accessed by referencing the value of the list pointer (Cap. List. Ptr) in the VPD Cap area. If the VPD Cap area is found accessible in step S12, then the host apparatus 10 goes to step S14 and checks to see if the protocol identification information PRO (card identifier) can be read. If the protocol identification information PRO is found readable in step S14, then the host apparatus 10 goes to step S16 and identifies the card 20, i.e., determines the specific protocol to be used based on the protocol identification information PRO. When the specific protocol is determined in accordance with the protocol identification information PRO, the host apparatus 10 starts communicating with the card 20 under that protocol.

If in step S12 the VPD Cap area is not found accessible (i.e., if the list pointer has no address pointing to a destination), that means there is no VPD Cap area in the configuration space. The host apparatus 10 then goes to step S18. In step S18, the host apparatus 10 stops performing any further operation, recognizes the attached card 20 as an unknown device, and carries out necessary processing such as providing notification that an unknown device has been detected.

If in step S14 the protocol identification information PRO (card identifier) is not found readable, the host apparatus 10 also goes to step S18. In step S18, the host apparatus 10 stops performing any further operation, recognizes the attached card 20 as an unknown device, and carries out necessary processing such as providing notification that an unknown device has been detected.

Figure 11:
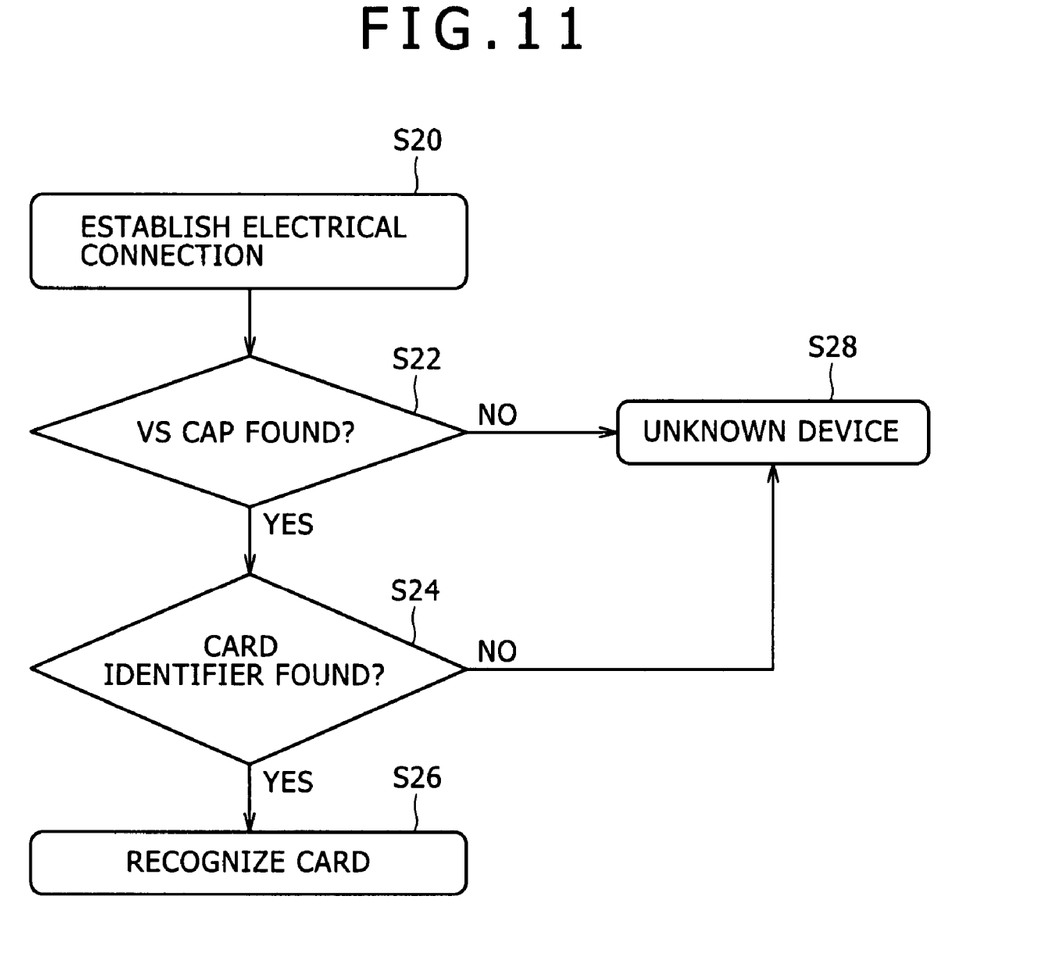
FIG. 11 is a flowchart of steps constituting a second example of the identifying operation performed by the host apparatus.

FIG. 11 is a flowchart of steps constituting the second example of the identifying operation performed by the host apparatus 10. In the second example, only the VS Cap area is used. In step S20, the card 20 is attached to the card slot of the host apparatus 10 so that an electrical connection is established between the card 20 and the host apparatus 10. The host apparatus 10 then attempts access to the CSH area. In step S22, the host apparatus 10 checks to determine whether the VPD Cap area can be accessed by referencing the value of the list pointer (Cap. List. Ptr) in the VPD Cap area. If the VPD Cap area is found accessible in step S22, then the host apparatus 10 goes to step S24 and checks to see if the protocol identification information PRO (card identifier) can be read. If the protocol identification PRO is found readable in step S24, then the host apparatus 10 goes to step S26 and identifies the card 20, i.e., determines the specific protocol to be used based on the protocol identification information PRO. When the specific protocol is determined in accordance with the protocol identification information PRO, the host apparatus 10 starts communicating with the card 20 under that protocol.

If in step S22 the VS Cap area is not found accessible (i.e., if the list pointer has no address pointing to a destination), that means there is no VS Cap area in the configuration space. The host apparatus 10 then goes to step S28. In step S28, the host apparatus 10 stops performing any further operation, recognizes the attached card 20 as an unknown device, and carries out necessary processing such as providing notification that an unknown device has been detected.

If in step S24 the protocol identification information PRO (card identifier) is not found readable, the host apparatus 10 also goes to step S28. In step S28, the host apparatus 10 stops performing any further operation, recognizes the attached card 20 as an unknown device, and carries out necessary processing such as providing notification that an unknown device has been detected.

Figure 12:
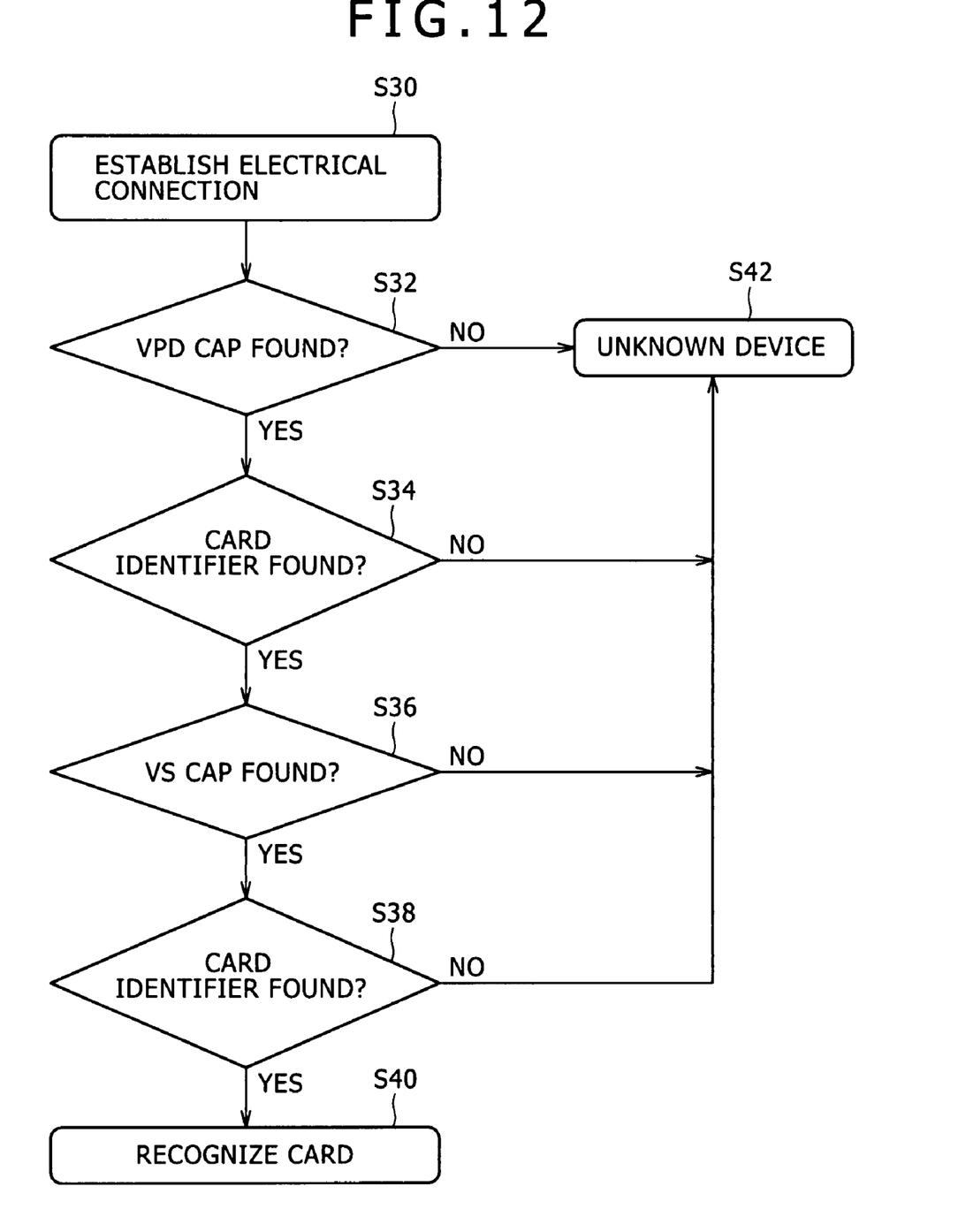
FIG. 12 is a flowchart of steps constituting a third example of the identifying operation performed by the host apparatus.

FIG. 12 is a flowchart of steps constituting the third example of the identifying operation performed by the host apparatus 10. In the third example, both the VPD Cap area and the VS Cap area are used. In step S30, the card 20 is attached to the card slot of the host apparatus 10 so that an electrical connection is established between the card 20 and the host apparatus 10. The host apparatus 10 then attempts access to the CSH area. In step S32, the host apparatus 10 checks to determine whether the VPD Cap area can be accessed by referencing the value of the list pointer (Cap. List. Ptr) in the VPD Cap area. If the VPD Cap area is found accessible in step S32, then the host apparatus 10 goes to step S34 and checks to see if the protocol identification information PRO (card identifier) can be read.

If the protocol identification information PRO is found readable in step S34, then the host apparatus 10 goes to step S36 and checks to determine whether the VS Cap area can be accessed by referencing the list pointer ("Next Pointer" field) in the VPD Cap area. If the VS Cap area is found accessible in step S36, the host apparatus 10 goes to step S36 and checks to see if the protocol identification information PRO (card identifier) can be read. If in step S38 the protocol identification information PRO is found readable, then the host apparatus 10 goes to step S40 and identifies the card 20 based on both the protocol identification information PRO found in this step and the protocol identification information PRO read in step S34. That is, the host apparatus 10 in step S40 determines the specific protocol to be used in accordance with the protocol identification information PRO and starts communicating with the card 20 under that protocol.

If in step S32 the VPD Cap area is not found accessible (i.e., if the list pointer has no address pointing to a destination), that means there is no VPD Cap area in the configuration space. The host apparatus 10 then goes to step S42. In step S42, the host apparatus 10 stops performing any further operation, recognizes the attached card 20 as an unknown device, and carries out necessary processing such as providing notification that an unknown device has been detected.

If in step S34 the protocol identification information PRO (card identifier) is not found readable, then the host apparatus 10 goes to step S42. In step S42, the host apparatus 10 stops performing any further operation, recognizes the attached card 20 as an unknown device, and carries out necessary processing such as providing notification that an unknown device has been detected.

If in step S36 the VS Cap area is not found accessible (i.e., if the list pointer has no address pointing to a destination), that means there is no VS Cap area in the configuration space. The host apparatus 10 then goes to step S42. In step S42, the host apparatus 10 stops performing any further operation, recognizes the attached card 20 as an unknown device, and carries out necessary processing such as providing notification that an unknown device has been detected.

If in step S38 the protocol identification information PRO (card identifier) is not found readable, the host apparatus 10 also goes to step S42. In step S42, the host apparatus 10 stops performing any further operation, recognizes the attached card 20 as an unknown device, and carries out necessary processing such as providing notification that an unknown device has been detected.

In this embodiment, the host controller 16 of the host apparatus 10 constitutes two units: a reading unit and a communication control unit. The reading unit accesses a plurality of configuration registers so as to read the protocol identification information PRO for discriminating the specific protocol from the first and the second special registers R1 and R2. The communication control unit communicates with the card 20 under the protocol found applicable to the card 20 based on the protocol identification information PRO read by the reading unit.

According to this embodiment, as described above, the protocol identification information for discriminating a specific protocol by which to establish communication between the host apparatus 10 and the card 20 is set in a special register or registers among a plurality of configuration registers furnished in the card 20. The special registers, along with their identification information, may be established arbitrarily and fixedly by the vendor. These arrangements allow the host apparatus 10 easily to discriminate or select the card type peripheral apparatus (i.e., protocol) without using a network or a storage medium. Compared with traditional structures involving the use of the network or storage medium, the inventive arrangements significantly reduce the costs of developing, designing, and fabricating the host apparatus 10 and the card 20.

The host apparatus 10 need not to be brought to its manufacturer or a service center in order to be furnished with additional discriminating factors. This aspect is also advantageous in terms of cost reduction. Because the special registers are part of the existing multiple configuration registers, there is no need to add new hardware or software to the host apparatus 10 or to the card 20. This is yet another advantage that contributes to reducing appreciably the costs of developing, designing, and fabricating the host apparatus 10 and the card 20.

The embodiment of the invention was described above as having both the first special register of VPD Cap and the second special register of VS Cap set with the protocol identification information PRO.

Alternatively, if either the first special register of VPD Cap or the second special register of VS Cap is assigned an area wide enough to accommodate the protocol identification information PRO, then solely that register may be utilized to have the PRO setting.

This embodiment was described above as supplementing the CSH area with both the VPD Cap area and the VS Cap area. The CSH area was shown accessed first to make reference to the value of its list pointer (Cap. List. Ptr), the list pointer value being used to access the VPD Cap area. With the VPD Cap area accessed, the value of its list pointer ("Next Pointer" Field) was shown referenced next to access the VS Cap area. Alternatively, the CSH area may be first accessed to make reference to the value of its list pointer (Cap. List. Ptr), the list pointer value being used to access the VS Cap area. With the VS Cap area accessed, the value of its pointer ("Next Pointer" field) may be referenced next to access the VPD Cap area.

As another alternative, the CSH area may be supplemented by either the VPD Cap area or the VS Cap area alone in the configuration space. In this case, either the VPD Cap area or the VS Cap area may be accessed by making reference to the value of the list pointer (Cap. List. Ptr) in the CSH area.

It is not mandatory to set the list pointer (Cap. List. Ptr) of CSH with the address of the VPD Cap area or with the address of the VS Cap area. Obviously, the CSH list pointer may instead be set with the address of any area other than the CSH area, VPD Cap area, or VS Cap area discussed above.

This embodiment was described above as having the host apparatus 10 practiced as a camera and the card 20 as a memory card. Alternatively, the host apparatus 10 may be any suitable apparatus as long as it can communicate with the card 20. The card 20 may also be any suitable apparatus as long as it is capable of communicating with the host apparatus 10.

A major characteristic of the present invention is that the protocol identification information for discriminating a specific protocol is set in a special register or registers among a plurality of configuration registers furnished in the card, the special registers being allowed to be established arbitrarily and fixedly by the vendor. The bus for connecting the host apparatus 10 with the card 20 may be any suitable bus and is not limited to the PCI Express bus discussed above.

It should be understood by those skilled in the art that various modifications, combinations, sub-combinations and alterations may occur depending on design requirements and other factor in so far as they are within the scope of the appended claims or the equivalents thereof.

The invention claimed is:

1. A peripheral apparatus, comprising:
   a storage unit that stores protocol identification information;
   a communication unit connected to a host apparatus for carrying out communication according to a specific protocol identified by the protocol identification information; and
   a configuration space that includes at least one configuration register, a first area, and a second area,
     the first area having first address information used for accessing the second area,
     the second area having a data register and an address register,
     wherein second address information used for accessing at least a part of the protocol identification information stored in the storage unit is set within the address register, and
     an indication that respective parts of the protocol identification information are to be successively accessed, one part after another, according to the second address information is set within the data register.

2. The peripheral apparatus according to claim 1, wherein after the host apparatus accesses a given part of the protocol identification information stored in the storage unit, if the host apparatus determines that the given part of the protocol identification information is unreadable, the peripheral apparatus is determined to be an unknown device.

3. The peripheral apparatus according to claim 1, wherein the host apparatus and said peripheral apparatus are communicably connected via a PCI Express bus, said PCI Express bus is furnished with said configuration space which serves as an address space and which accommodates a plurality of such configuration registers, said configuration space includes a plurality of areas, one of said plurality of areas being a configuration space header, another of said plurality of areas constituting a vital product data capability structure, and a special register is accommodated in the area of said vital product data capability structure.

4. The peripheral apparatus according to claim 1, wherein said communication unit includes a PCI Express device.

5. A host apparatus that is connectable to a peripheral apparatus having a storage unit that stores protocol identification information, a communication unit for carrying out communication according to a specific protocol, and a configuration space that includes at least one register, a first area, and a second area, said host apparatus comprising:
   a reading unit configured to (i) access the first area and read first address information for accessing the second area, (ii) access the second area using the first address information, and read (a) second address information set within an address register of the second area and used for accessing at least a part of the protocol identification information stored in the storage unit and (b) an indication set within a data register of the second area that respective parts of the protocol identification information are to be successively accessed, one part after another, and (iii) successively access and read respective parts of the protocol identification information stored in the storage unit, one part after another, according to the second address information, the protocol identification information being used to identify the specific protocol used for communication with the peripheral apparatus; and
   a communication control unit configured to communicate with the peripheral apparatus according to the specific protocol based on the protocol identification information read by said reading unit.

6. The host apparatus according to claim 5, wherein after said reading unit accesses a given part of the protocol identification information stored in the storage unit, if said reading unit determines that the given part of the protocol identification information is unreadable, the peripheral apparatus is determined to be an unknown device.

7. The host apparatus according to claim 5, wherein said host apparatus and the peripheral apparatus are communicably connected via a PCI Express bus, said PCI Express bus is furnished with said configuration space which serves as an address space which accommodates a plurality of such configuration registers, said configuration space includes a plurality of areas, one of the plurality of areas being a configuration space header, another of the plurality of areas constituting a vital product data capability structure, and a special register is accommodated in the area of said vital product data capability structure.

8. The host apparatus according to claim 5, wherein said communication unit includes a PCI Express bus.

9. A system, comprising:
   a host apparatus; and
   a peripheral apparatus connected to said host apparatus;
   said peripheral apparatus including:
     a storage unit that stores protocol identification information,
     a communication unit connected to a host apparatus for carrying out communication according to a specific protocol identified by the protocol identification information, and a configuration space that includes at least one configuration register, a first area, and a second area, the first area having first address information used for accessing the second area, the second area having a data register and an address register, wherein second address information used for accessing at least a part of the protocol identification information stored in the storage unit is set within the address register, and an indication that respective parts of the protocol identification information are to be successively accessed, one part after another, according to the second address information is set within the data register;

said host apparatus including:

a reading unit configured to (i) access the first area and read first address information for accessing the second area, (ii) access the second area using the first address information, and read (a) the second address information set within the address register of the second area and (b) the indication set within the data register of the second area that respective parts of the protocol identification information are to be successively accessed, one part after another, and (iii) successively access and read respective parts of the protocol identification information stored in the storage unit, one part after another, according to the second address information, and a communication control unit configured to communicate with the peripheral apparatus according to the specific protocol based on the protocol identification information read by said reading unit.

10. The system according to claim 9, wherein said host apparatus and the peripheral apparatus are communicably connected via a PCI Express bus, said PCI Express bus is furnished with said configuration space which serves as an address space which accommodates a plurality of such configuration registers, said configuration space includes a plurality of areas, one of the plurality of areas being a configuration space header, another of the plurality of areas constituting a vital product data capability structure, and a special register is accommodated in the area of said vital product data capability structure.

11. The system according to claim 9, wherein said communication unit includes a PCI Express bus.

12. The system according to claim 9, wherein after said reading unit of said host apparatus accesses a given part of the protocol identification information stored in the storage unit of said peripheral apparatus, if said reading unit determines that the given part of the protocol identification information is unreadable, the peripheral apparatus is determined to be an unknown device.

* * * * *